United States Patent

Nozaki et al.

Patent Number: 5,267,044
Date of Patent: Nov. 30, 1993

[54] AUTOMATIC FOCUSING SYSTEM FOR USE IN CAMERAS HAVING ZOOMING FUNCTION

[75] Inventors: Mitsuyuki Nozaki; Kazushige Ooi, both of Saitama; Keiji Izumi, Tokyo, all of Japan

[73] Assignee: Kabushiki Kaisha Toshiba, Japan

[21] Appl. No.: 727,907

[22] Filed: Jul. 10, 1991

[30] Foreign Application Priority Data

Jul. 13, 1990 [JP] Japan .................. 2-184220

[51] Int. Cl.⁵ .................. H04N 5/232; H04N 5/225
[52] U.S. Cl. .................. 358/227; 358/225; 354/402
[58] Field of Search .................. 358/227, 225, 209; 354/402, 404

[56] References Cited

U.S. PATENT DOCUMENTS

| | | |
|---|---|---|
| 4,320,417 | 3/1982 | Hanma . |
| 4,609,260 | 9/1986 | Kawai . |
| 4,611,244 | 9/1986 | Hanma et al. ............ 358/227 |
| 4,969,044 | 11/1990 | Hijikata et al. ............ 358/227 |
| 5,060,001 | 10/1991 | Kaneda ............ 358/227 |
| 5,061,954 | 10/1991 | Toyama et al. ............ 358/227 |
| 5,113,214 | 5/1992 | Nagata et al. ............ 358/227 |

FOREIGN PATENT DOCUMENTS

| | | |
|---|---|---|
| 0334003 | 9/1989 | European Pat. Off. . |
| 0361523 | 4/1990 | European Pat. Off. . |
| 19937 | 5/1984 | Japan . |
| 5914717 | 2/1986 | Japan . |

OTHER PUBLICATIONS

Ishida et al., "Auto focusing in TV camera by using peak value servo system," *NHK Technical Research*, vol. 17, No. 1, 1965.

*Primary Examiner*—Joseph Mancuso
*Assistant Examiner*—Wendy R. Greening
*Attorney, Agent, or Firm*—Banner, Birch, McKie & Beckett

[57] ABSTRACT

An auto focus apparatus for a camera comprising a group of lenses which include a focus lens and a zoom lens. The auto focus apparatus also comprises a focus detector, a motor and a controller. The focus detector detects whether the camera is in focus or not. The motor drives the focus lens and zoom lens. The controller controls the motor for driving the zoom lens and the focus lens. When the focus detector does not detect a focused image through the focus lens, the zoom lens is then driven to focus the camera. A method of auto focusing comprises the step of driving a focus lens so as to obtain a focusing point. The method of auto focusing also comprises the steps of detecting whether the camera is in focus or not, and driving the zoom lens when a focusing point is not achieved by the focus lens.

13 Claims, 4 Drawing Sheets

AUTOMATIC FOCUSING SYSTEM FOR USE IN CAMERAS HAVING ZOOMING FUNCTION

BACKGROUND OF THE INVENTION

1. Field of the Invention

The present invention relates to an auto focus apparatus and more particularly, to an auto focus apparatus which brings into focus ordinary areas as well as wide angle or close up subjects.

2. Description of the Related Art

There are two main auto focus systems in auto focus apparatus used in photographic cameras and video cameras. One is an active system such as an infrared system or an ultrasonic system, and the other is a passive system such as a Through the Camera Lens (TCL) or picture detection system.

An active auto focus system emits radio waves or sonic waves from a camera and uses waves reflected from a subject to detect the distance between the camera and the subject. On the other hand, a passive auto focus system uses information about the imaged picture from a sensor such as a charge coupled device (CCD) to control focus. In both systems, whether the camera is in focus or not is detected by using different focus information. If the camera is not in focus, a focus ring associated with a focus lens of the camera is rotated by a focus control motor to provide a proper focus. In the case where there is no focusing point, the focus ring is stopped at a predetermined position to prevent the control motor from rotating continuously. However, the picture taken will be out of focus.

SUMMARY OF THE INVENTION

Accordingly, it is an object of the present invention to provide an improved auto focus apparatus and method of auto focusing where the lens may focus on a subject at all distances.

In accordance with the present invention, the foregoing object is achieved by providing an auto focus apparatus having at least a focus lens and a zoom lens. A drive motor is coupled to each of the lenses. Focusing is achieved by using a focus detector which operates a controller for the drive motors. If camera focus cannot be achieved with the focus lens, then the controller causes the zoom lens to be driven to a focusing point.

A method for causing the camera to be in focus regardless of the distance to the subject is also set forth. Thus, the camera can automatically select the proper lens to be used on the subject.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its attendant advantages will be readily obtained by reference to the following detailed description considered in connection with the accompanying drawings in which.

DETAILED DESCRIPTION OF THE PREFERRED EMBODIMENTS

The preferred embodiment of the present invention will now be described in more detail with reference to the accompanying drawings, wherein like numerals indicate like elements.

Figure 1:
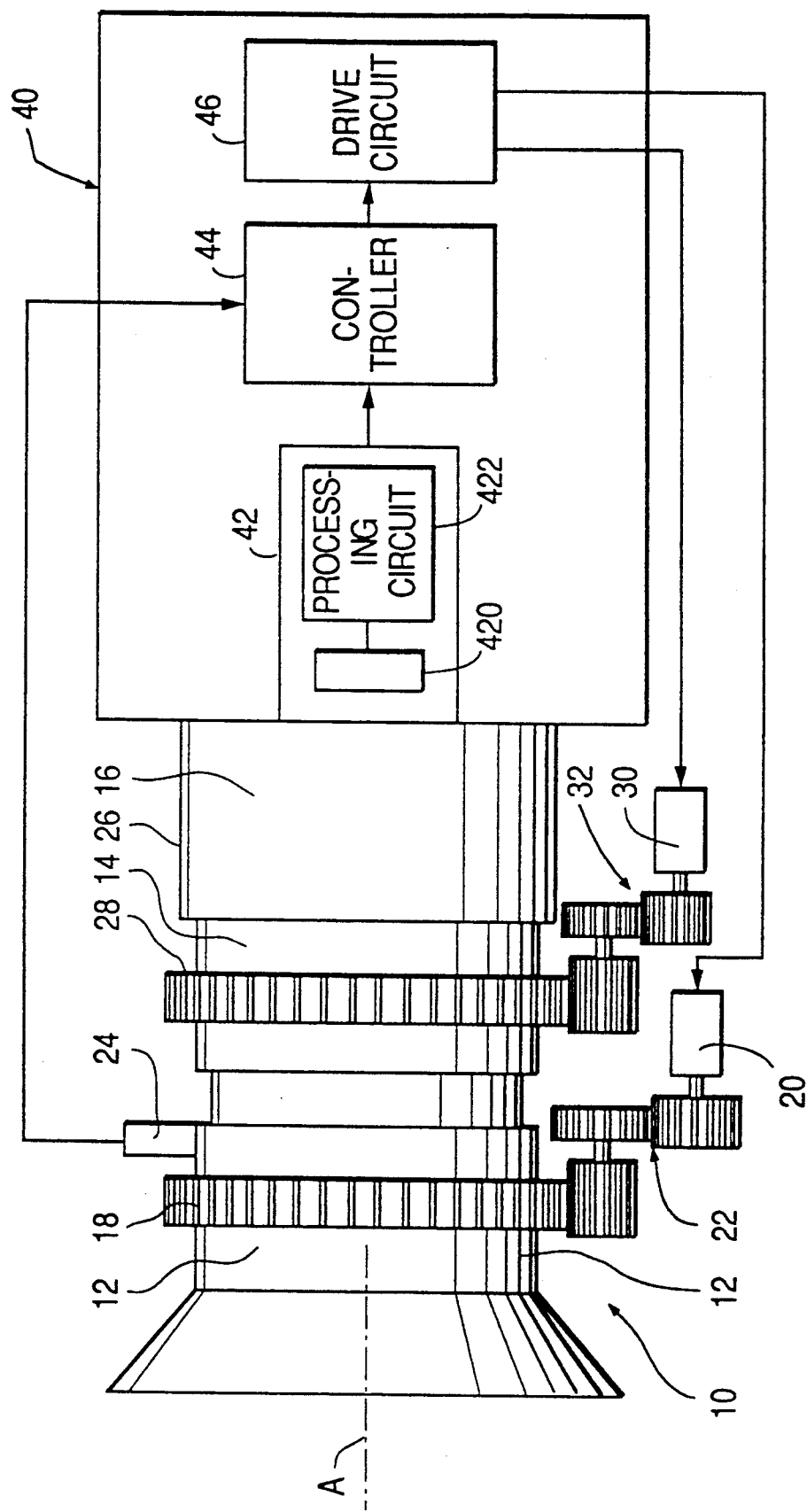
FIG. 1 shows a block diagram of an auto focus apparatus according to the present invention.

Referring to FIG. 1, lens 10 includes focus lens 12, zoom lens 14 and fixed lens 16. All lenses are contained in tubes to prevent them from being scratched or broken. Focus ring 18 is formed around the tube containing focus lens 12. Focus lens 12 is driven along light axis A by rotating focus ring 18. Focus ring 18 can be driven manually or by focus motor 20. Focus motor 20 is coupled to focus ring 18 via gears 22.

Position detector 24 is attached to fixed tube 26 and detects the position (rotation angle) of focus lens 12. Position detector 24 detects the position by, for example, counting electric pulses generated according to the rotation of focus ring 18. Such pulses could be created by black and white marks attached alternately to focus ring 18 along its periphery. A light source would be provided and a light receiver (not shown) would then receive the reflecting light from white marks and transduce the reflected light to pulses. Both the light source and light receiver would be attached to fixed tube 26. Thus, the amount of rotation of focus ring 18 is detected by counting pulses generated from the light receiver by a counter.

Zoom ring 28 is formed around the tube containing zoom lens 14. Zoom lens 14 is driven along light axis A by rotating zoom ring 28. Zoom ring 28 can be driven manually or by zoom motor 30. Zoom motor 30 is coupled to zoom ring 28 via gears 32.

Circuit 40 includes imaging circuit 42, controller 44 and motor drive circuit 46. Imaging circuit 42 includes imaging device 420 which transforms optical images obtained through lenses 12, 14 and 16 to electrical signals to obtain picture information (video signal). Imaging circuit 42 also includes processing circuit 422 which processes picture information electrical signals from imaging device 420. Controller 44 is connected to imaging circuit 42 and position detector 24. Controller 44 detects whether the camera is in focus or not from the picture information electrical signals obtained from imaging circuit 42. This detection is accomplished by detecting increasing amounts of a high frequency component of input video signal to controller 44. The high frequency component that is utilized is part of the picture information electrical signal (video signal) sent from an imaging device such as a CCD. Derivation of the high frequency component can be achieved by sending the video signal through a band pass filter (BPF). The frequency utilized as well a sth BPF are dependent upon the camera system and design. Thus, it will be apparent to those skilled in the art that different frequency components can be used in focusing the camera.

The high frequency component of a video signal increases proportional to the degree of being in focus. Thus, when the amount or value of this high frequency component is greatest, the camera is in focus. Controller 44 supplies a control signal to drive circuit 46 for focusing. Controller 44 receives information about the position of focus lens 12 from position detector 24. When controller 44 receives the information that focus lens 12 has reached the terminal point, controller 44 orders drive circuit 46 to rotate focus motor 20 in the reverse direction. Drive circuit 46 is connected to controller 44 and drives focus motor 20 and zoom motor 30 depending upon orders from controller 44.

Figure 2A:
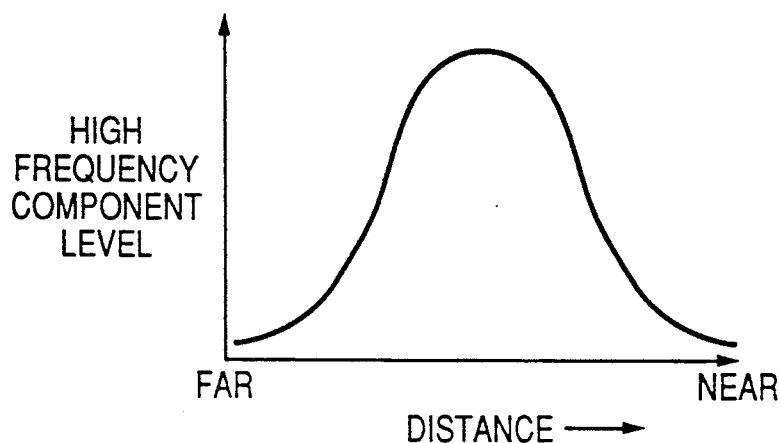
FIGS. 2A-C and 3 show characteristic curves illustrating the relation between a position of the focus ring and change of the level of a high frequency component.
Figure 2B:
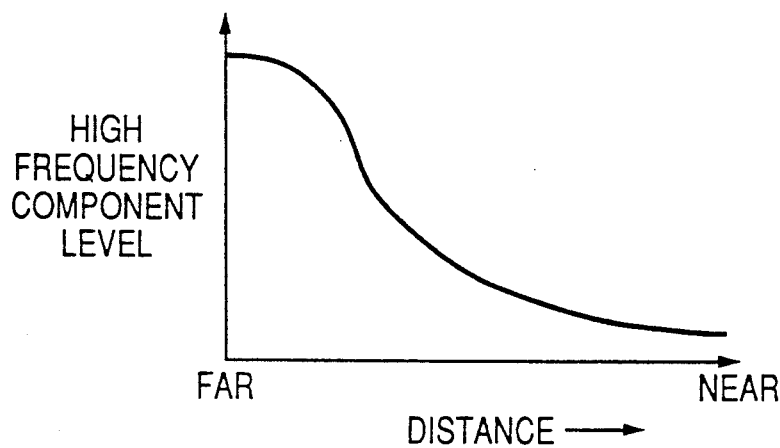
Figure 2C:
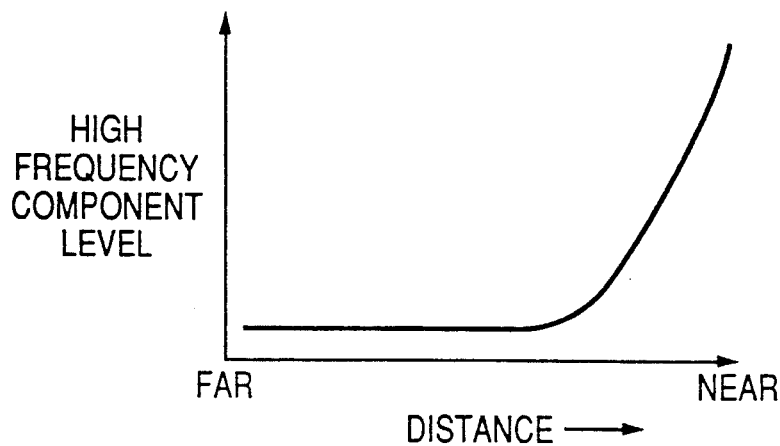

In operation, an optical image of a subject taken through lens portion 10 is transformed to an electrical signal by imaging circuit 42 and supplied to controller 44. Whether the camera is in focus or not is detected by an output signal from imaging circuit 42. In essence, focusing is achieved because a video signal obtained through the lens has a greater amount of high frequency components which are proportional to the degree of being in focus, as mentioned above. FIGS. 2(A) through 2(C) illustrate camera focusing plotted as distance from camera versus the high frequency component level. FIG. 2(A) shows the camera in focus at a middle point (that is, a middle point in the angle of rotation of focus ring 18). In FIG. 2(A), the level of the high frequency component has its greatest value at the midpoint of the rotation angle, where the picture is in focus. FIGS. 2(B) and 2(C) show the camera in focus at both far and near distances, respectively. That is, focus ring 18 is positioned at or close to the end points of the rotation angle.

In the case of FIG. 2(A), controller 44 controls auto focusing by using a method which detects the peak value of the high frequency component level by rotating focus ring 18. That is, controller 44 changes the output control signal to drive circuit 46 as the peak value is detected. The peak value control method is described in, for example, "Auto focusing in TV cameras by using a peak value servo system" (Ishida, et al., NHK technical research, Vol. 17, No. 1, 1965).

The peak value of the high frequency component can be determined by trial and error. Thus, upon initial operation, the focus lens is driven slightly in one direction. If the high frequency component measured at the new point has decreased from the initial condition, the focus lens is then driven in the reverse direction. If the high frequency component measured has increased from its initial condition, the focus lens is driven in that same direction in small intervals toward the peak value. As the iterations continue, and if the peak value is passed, the focus lens is driven in the reverse direction to determine the peak value.

In FIGS. 2(B) and (C), the focusing point is at the end points of the angle of rotation of focus ring 18. Autofocusing control needs to stop at the end point that is in-focus. In this situation, it is impossible to detect a decreasing value of the high frequency component during the iterative process, since all values of the high frequency component are increasing from one end point of focus lens adjustment to the other end point. Thus, the controller transmits the signal to stop the focus motor at the point where the value of the high frequency component is greatest.

Figure 3:
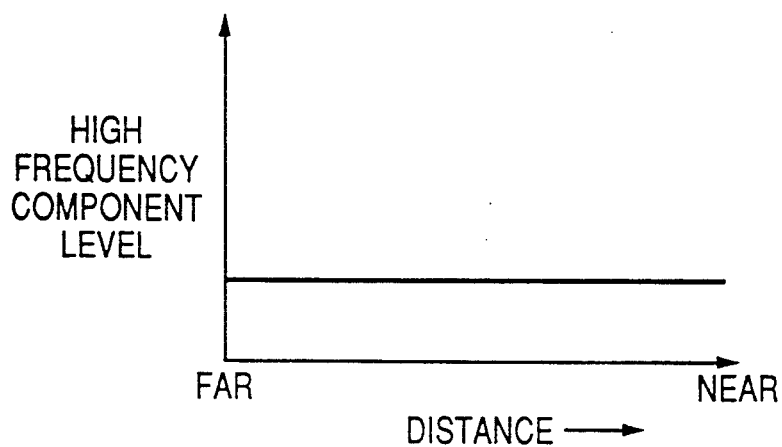
Figure 4:
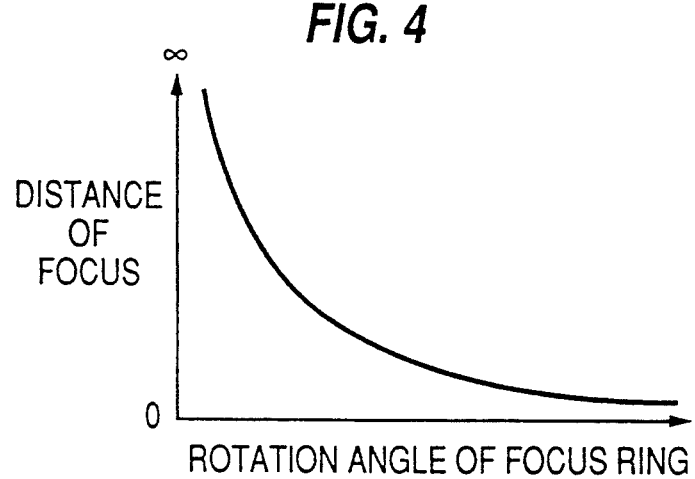
FIG. 4 shows a characteristic curve illustrating the relation between a rotation angle of focus ring and focus distance.
Figure 5:
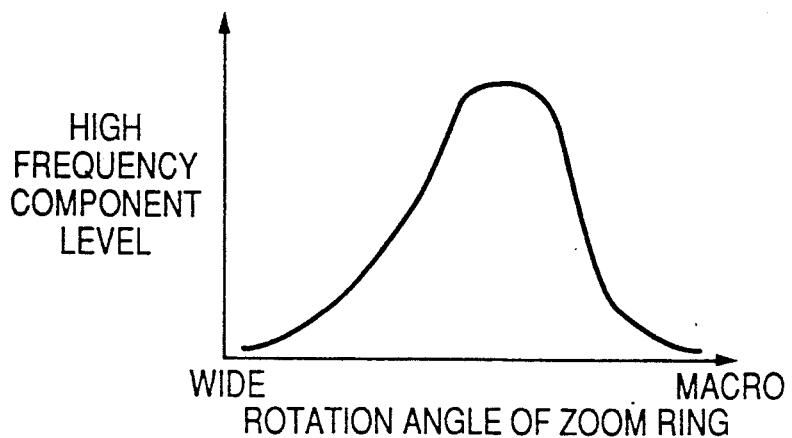
FIG. 5 shows a characteristic curve illustrating the relation between a rotation angle of the zoom ring and change of the level of a high frequency component.

In case there is no peak value for the high frequency component of the video signal as the angle of rotation of focus ring 18 is varied between near and far distances the high frequency component remains relatively flat as shown in FIG. 3. Since the rotation angle of focus ring 18 converges at longer distances of focus for a particular lens as shown in FIG. 4, it is assumed that there is no focusing point within the range of rotation of focus ring 18. Thus, the picture would have to be taken at an extremely short distance, in which event, zoom lens 14 is used. In the latter case, the high frequency component of the video signal has a characteristic curve as shown in FIG. 5. The high frequency component is plotted versus the rotation angle of the zoom ring, thus, the maximum value of the high frequency component can be found and the picture will be in focus.

Figure 6:
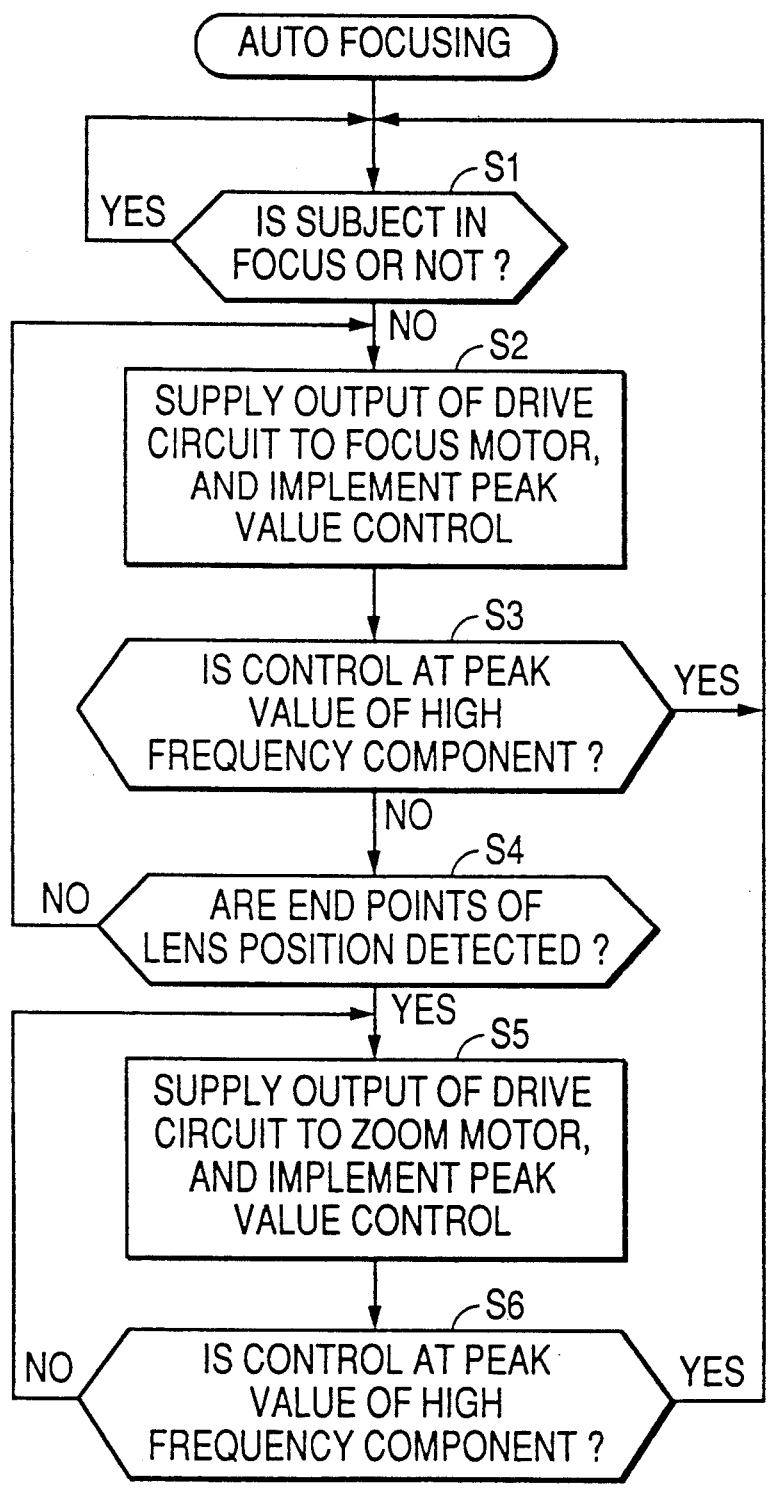
FIG. 6 illustrates a flow chart of a controller shown in FIG. 1.

If no focusing point is achieved by rotating focus ring 18, and if both terminal points of focus lens 12 have been detected by position detector 24, controller 44 stops driving focus ring 18, and starts driving zoom ring 28 to focus the camera. FIG. 6 illustrates the steps of the method. In step S1, whether the optical image as seen through lenses 12, 14, 16 is in focus or not is determined. If the answer is YES, then auto focusing is maintained for this lens position. If the answer is NO, then step S2 is initiated. The output from drive circuit 46 is then supplied to focus motor 20. Controller 44 then implements peak value control as mentioned above. This controlling involves detecting the high frequency component of the video signal from imaging circuit 42 while driving focus motor 20 by drive circuit 46.

Next, it is determined whether camera focus can be achieved with lens 12 in step S3. In step S3, the peak of the high frequency component is determined. If the peak value is reached, the answer is YES (this means that optical image is in focus), the flow moves back to step S1. If the answer is NO (this means that the focusing point cannot be obtained by rotation of focus ring 18), the flow moves to step S4. Step S4 determines whether both end points of focus lens 18 have been reached. If these points have not been reached (answer is NO), the flow moves back to step S2 (i.e., peak value control continues). If these points have been reached (answer is YES), the flow moves to step S5. In this example, as described above, focus cannot be obtained by rotating focus ring 18 (the focusing point is extremely near to the camera). In step S5, the output of drive circuit 46 is supplied to zoom motor 28, and not to focus motor 20. Peak value control is implemented. The next step S6 is begun. Step S6 is similar to step S3, because the peak value of the high frequency component is determined, but only with zoom lens 14 being the driven lens. If focus is not achieved (the answer being NO), then the flow moves back to Step S5, with peak value control continue. If auto focusing is achieved and the focusing point is at a short distance (in step S6, answer is YES), then the flow moves back again to step S1.

Numerous characteristics and advantages of the invention have been described in detail. However, the disclosure is illustrative only and the invention is not so limited. Various changes and modifications may be effected by one having ordinary skill in the art without departing from the scope or spirit of the invention. For example, the detector which detects the focusing point by using information about the video signal transformed by an imaging device from an optical image obtained through the lenses is used as the focus detector. However, the present invention is not limited to this particular detector, other kinds of detectors such as detectors which use infrared rays or supersonic waves or line CCD (charge coupled device), etc. (including any detector using a reflected wave from the subject) may be adopted.

In the above embodiment, a focus lens, a zoom lens and a fixed lens are referred to as a group of lenses. However, the present invention is not limited to this group of lenses. Other combinations or arrangements of lenses, or addition of another lenses, or fewer lenses are possible. At least two lenses such as a zoom lens and a focus lens are needed. Additionally, each lens such as zoom lens is ordinarily comprised of a plurality of lenses. However, in the above embodiment, all these lenses are treated as single lenses to simplify the discussion. Additionally, instead of position detector 24 of focus ring 18 as described above, the position detector need not use a photo sensor but a mechanical switch, or a device for counting the pulses from focus motor 20 may be adopted.

What is claimed is:

1. An auto focus apparatus for a camera comprising:
   a group of lenses including a focus lens having a near terminal point and a far terminal point and a zoom lens;
   lens drive means for driving said zoom lens and focus lens; and
   controller means for determining whether a subject is in focus and controlling said lens drive means to drive said zoom lens and said focus lens to adjust the focussing of the subject, said controller means further enabling said lens drive means to switch from driving said focus lens to said zoom lens upon a determination by the controller means that the subject is not in focus and said focus lens has been driven to both said near and far terminal points, regardless of which terminal point was reached first.

2. An auto focus apparatus as claimed in claim 1 further comprising imaging means for transforming optical images obtained through the group of lenses into a video signal.

3. An auto focus apparatus as claimed in claim 2 wherein said controller means detects whether the subject is in focus or not by using information about a high frequency component of the video signal from the imaging means.

4. An auto focus apparatus as claimed in claim 1 wherein the focus lens is used to focus when the subject is within a predetermined range and the zoom lens is used to focus when the subject is within a range closer than said predetermined range.

5. An auto focus apparatus as claimed in claim 1 further comprising a focus ring and a zoom ring coupled to the focus lens and the zoom lens, respectively.

6. An auto focus apparatus as claimed in claim 5 wherein the lens drive means is coupled to said focus ring and said zoom ring to effect driving of said focus lens and said zoom lens.

7. An auto focus apparatus as claimed in claim 6 further comprising a position detector for detecting a position of the focus lens by detecting a position of the focus ring.

8. An auto focus apparatus as claimed in claim 7 wherein said controller means activates the lens drive means to drive the zoom lens when said controller means does not detect the subject is in focus and the position detector detects said terminal points of the focus lens.

9. An auto focus apparatus as claimed in claim 1 further comprising a position detector for detecting a position of the focus lens.

10. An auto focus apparatus as claimed in claim 9 wherein the controller controls the lens drive means for driving the zoom lens when said controller means does not detect the subject is in focus and the position detector detects the terminal points of the focus lens.

11. A method of auto focusing a camera having a focus lens having a near terminal point and a far terminal point, and a zoom lens; lens drive means for driving said focus lens and said zoom lens; and controller means for determining whether a subject is in focus and controlling said lens drive means to drive said focus lens and said zoom lens, said controller means further enabling said lens drive means to switch from driving said focus lens to said zoom lens, the steps of the method comprising:
   driving said focus lens to attempt to focus the subject;
   determining whether the subject is in focus by using said controller means; and
   driving said zoom lens when the subject is determined to be out of focus and said controller means has determined that said focus lens has been driven to both said near and far terminal points, regardless of which terminal point was reached first.

12. A method of auto focusing as claimed in claim 11, further comprising the step of detecting the position of the focus lens by using position detector means.

13. A method of auto focusing as claimed in claim 11, wherein the step of determining whether the subject is in focus includes the step of detecting whether the subject is in focus or not by using information from a video signal obtained from an imaging device which transforms the optical image obtained through the lenses to a video signal.

* * * * *